US011960468B1

(12) United States Patent
Wang et al.

(10) Patent No.: US 11,960,468 B1
(45) Date of Patent: Apr. 16, 2024

(54) LATE-BINDING DATABASE VIEWS

(71) Applicant: Amazon Technologies, Inc., Seattle, WA (US)

(72) Inventors: Huiyuan Wang, Union City, CA (US); Meng Tong, San Jose, CA (US); Naresh Kishin Chainani, Mountain View, CA (US); Mengchu Cai, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/982,944

(22) Filed: May 17, 2018

(51) Int. Cl.
 *G06F 16/23* (2019.01)
 *G06F 16/2453* (2019.01)
 *G06F 16/80* (2019.01)

(52) U.S. Cl.
 CPC .... *G06F 16/2365* (2019.01); *G06F 16/24539* (2019.01); *G06F 16/80* (2019.01)

(58) Field of Classification Search
 CPC . G06F 16/2365; G06F 16/24539; G06F 16/80
 See application file for complete search history.

(56) References Cited

U.S. PATENT DOCUMENTS

| 2001/0013030 | A1* | 8/2001 | Colby | G06F 16/24539 |
| 2005/0138013 | A1* | 6/2005 | Walker | G06F 16/24552 |
| 2006/0282424 | A1* | 12/2006 | Larson | G06F 16/24535 |
| 2011/0208808 | A1* | 8/2011 | Corbett | G06F 16/2453 709/203 |
| 2011/0307472 | A1* | 12/2011 | Slezak | G06F 16/283 707/719 |
| 2012/0054175 | A1* | 3/2012 | Barsness | G06F 16/2455 707/719 |
| 2012/0265734 | A1* | 10/2012 | Perez | G06F 16/211 707/687 |
| 2013/0110879 | A1* | 5/2013 | Winternitz | G06F 16/23 707/792 |
| 2015/0339354 | A1* | 11/2015 | Nahum | G16H 10/60 707/722 |
| 2019/0102476 | A1* | 4/2019 | Liu | G06F 16/83 |

OTHER PUBLICATIONS

Oracle, "Database SQL Reference," Oracle Database Online Documentation, 10g Release 2 (10.2), retrieved on Jul. 31, 2018, from https://docs.oracle.com/cd/B19306_01/server.102/b14200/statements_8004.htm, 14 pages.

* cited by examiner

*Primary Examiner* — Amy Ng
*Assistant Examiner* — Dustin D Eyers
(74) *Attorney, Agent, or Firm* — Davis Wright Tremaine LLP

(57) ABSTRACT

A database management system receives a command defining a view of the database. The view definition is accepted without determining whether references to schema elements within the view definition are resolvable to existing elements of the database schema. A query of the view is received. In response to the query of the view, the database management system resolves references to schema elements in the view definition by determining whether the references correspond to data available for processing the query.

20 Claims, 7 Drawing Sheets

LATE-BINDING DATABASE VIEWS

BACKGROUND

Database views are employed to simplify the process of obtaining data from a database. For example, a database management system might maintain a complex structure of normalized database tables that, while efficient for storing data, are difficult to use when generating a report or analyzing data. Database views provide a convenient way to consolidate data into a more convenient format for these purposes.

Typically, database views are created and materialized in response to a data definition language command. A database view is not generally considered valid unless it can be materialized. In other words, database management systems typically consider a database view to be valid only if all of the data necessary to create the view is available at the time the view is defined.

BRIEF DESCRIPTION OF THE DRAWINGS

Various techniques will be described with reference to the drawings, in which.

DETAILED DESCRIPTION

Embodiments of the disclosure are directed to the definition and processing of views in a database management system. In an embodiment, a database management system receives a command to create a view. The command includes a view definition that includes a reference to a schema element. The database management system validates the view definition without regard to whether or not the reference can be resolved to a corresponding set of data. The database management system allows the view to be queried. The database management system resolves the reference in response to an execution of the query.

In an embodiment, a view definition contains a reference to schema element that does not exist at the time the view is defined. In a further aspect, the data corresponding to the schema element is data that is added, at a future time, to a collection of data maintained on a storage system or storage service remote to the database management system. At each query execution, the database management system resolves the schema reference to determine whether or not the data corresponding to the schema element exists and is available from the storage service to process the query.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages. For example, an embodiment provides the capability to create database views over data sources with undefined or evolving schemas. In another example, an embodiment provides the capability to create database views in which structured data is combined with unstructured or semi-structured data. In another example, an embodiment provides increased efficiency in defining and maintaining database views.

Figure 1:
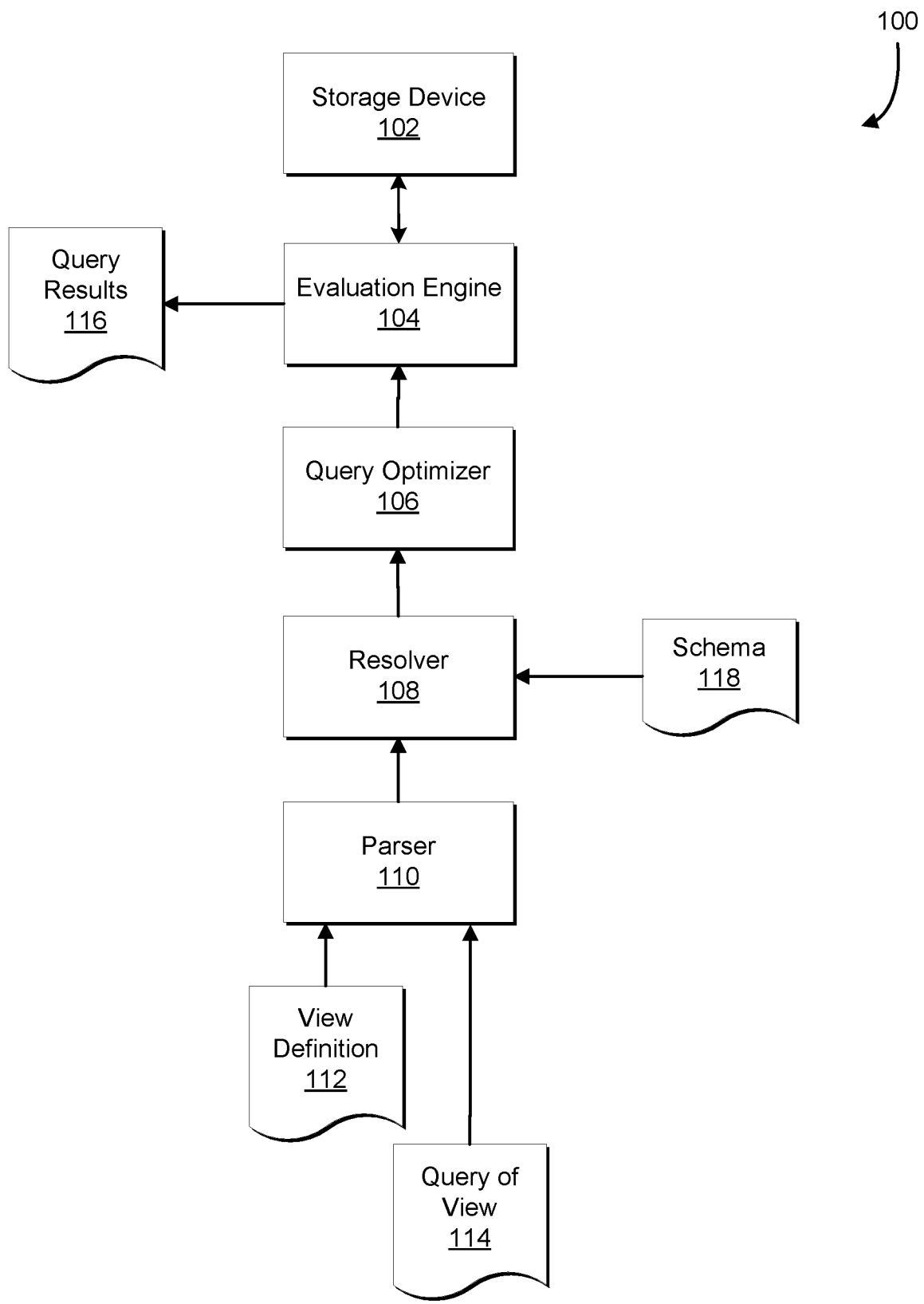
FIG. 1 illustrates an example database management system, in accordance with an embodiment.

In an embodiment, a database management system is a computing system adapted to store and retrieve data from a storage device. In an embodiment, such as the embodiment of a database management system depicted in FIG. 1, is implemented on one or more computing devices comprising at least one processor and memory storing instructions that, when executed, perform storage and retrieval operations. In an embodiment, a database management system is implemented on one or more application servers, such as the application servers described herein.

In an embodiment, a database management system includes support for defining and querying views. A view is a database object that may be used in a manner similar to a database table. For example, a view appears to the user as if it were comprised of rows and columns, and may be queried as if were a database table. The view itself is defined in terms of a query that indicates what data is included in the view. Typically, the query includes a clause, sometimes described as a projection clause, which specifies the columns that make up the view. The column references that may be included in a projection clause are examples of a reference to an element of a database schema.

In an embodiment, a database schema is a catalogue or other collection of data, maintained by the database management system, which defines the organization of other data stored by the system. For example, a database schema may define the row-and-column structure of tables that are maintained by the database, interrelationships between the tables, and constraints on the data.

In an embodiment, a command to create a view is validated without determining whether or not the associated definition of the view includes references to elements of a schema that are valid. In an embodiment, the view is added to the database schema without being resolved, and a query against the view may be submitted to and executed by the database management system prior to the reference being resolved. Instead, in an embodiment, any unresolved references to schema elements are resolved at query execution time. Moreover, the references may be resolved each time the query is executed, in order to provide support for cases in which remotely stored data, semi-structured data, or unstructured data is utilized in the execution of the query.

FIG. 1 illustrates an example database management system, in accordance with an embodiment. A database management system 100 comprises one or more computing systems, such as the application servers described herein, and software modules comprising instructions executed by one or more processors of the computing systems. The instructions, in response to being executed by the processors, cause the database management system to perform functions including, but not limited to, data storage and retrieval operations on collections of data. Examples of database management systems include, but are not limited to, relational database management systems, key-value database management systems, NoSQL database management systems, object databases, and document management systems.

In an embodiment, the database management system 100 maintains a collection of data organized in accordance with a database schema 118. The database schema 118 describes how a data collection maintained by the database management system 100 is structured. As one example, in an embodiment the database management system 100 is a relational database management system comprising a number of tables. Each table is organized using a row-and-column structure. The schema 118, in this example, defines the columns included in each table.

In an embodiment, queries of the tables maintained by the database are provided as textual statements, sometimes referred to as queries. A query defines the set of data that is to be returned by processing the query, and includes references to elements of the schema 118, such as the names of tables or columns of data that is to be retrieved by the execution of the query. An example of a query is a structured query language ("SQL") query. Other examples include, but are not limited to, other varieties of declarative query languages, procedural query languages, multidimensional expressions languages, object-oriented query languages, and so on.

In an embodiment, a view definition 112 is part of a command that instructs the database management system 100 to create a database view. A view is typically defined in terms of a query over one or more tables. For example, a view might be defined by a SQL query that joins two or more tables. The view-defining query might further comprise projection clauses which refer to the columns of the joined tables. The references to tables and columns in the SQL query are examples of references to elements of a database schema. It will be appreciated that this example is intended to be illustrative, and as such should not be construed so as to limit the scope of the present disclosure to only the example provided.

In an embodiment, the database management system 100 validates the view definition 112 by parsing a command and determining, based on the parsing, that the command contains a view definition 112. In an embodiment, the database management system further validates the view by determining that the view definition 112 is syntactically correct, but does not resolve at least one of the references to schema elements that are included in the view definition.

In an embodiment, the database management system 100 compiles the view definition 112 each time a query 114 directed at the view is executed. Compiling the view comprises parsing, examining, or otherwise processing the view definition. Output of the compilation included data identifying references to schema elements included in the view definition.

In an embodiment, the database management system 100 resolves the references to the schema elements each time a query 114 of the view is executed. In an embodiment, resolving references comprises determining whether the reference refers to a valid element of the database's schema. In cases and embodiments, resolving a reference is followed by locating the data identified by the reference, so that the data may be included in the result of a query.

In an embodiment, the database management system 100 materializes a view based on the view definition 112. In an embodiment, materializing the view comprises executing the queries that define the view, and storing the data that results. The database management system 100 may then use the resulting data when processing a query 114 that is directed to the view.

In an embodiment, the database management system 100 does not immediately compile the view definition 112, resolve references, or materialize the view. Moreover, the database management system 100 performs compilation, reference resolution, and materialization each time a query of the view is processed. As such, while some database management systems may perform these operations when the command to create the view is received, or materialize the view when the view is queried for the first time, embodiments of the data management system 100 perform the operations each time a query 114 of the view is executed.

In an embodiment, the database management system 100 compiles the view definition 112 when the view definition 112 is received, but does not resolve references or materialize the view until a query 114 of the view is processed, and moreover resolves references and materializes the view each time the query 114 of the view is executed.

In an embodiment, a view definition comprises nested queries, which may sometimes be referred to as subqueries. For example, in an embodiment the database management system 100 receives a view definition 112 which comprises an outer query referencing data stored locally, and an inner query referencing data stored remotely. In another example, the view definition 112 comprises a join of queries referencing local data and remote data. It will be appreciated that these examples are intended to be illustrative, and should not be construed so as to limit the scope of the present disclosure to only the specific examples provided.

In an embodiment, a view is partially materialized. For example, in some cases and embodiments, the database management system 100 partially materializes the view by executing selected portions of the defining queries, by storing selected portions of the results of executing the defining queries, and so forth. In an embodiment, the partially materialized portions are for subqueries that do not include unresolved references to schema elements. For the remaining, unmaterialized portions, the database management system, in an embodiment, resolves references to schema elements each time a query of the view is executed.

In an embodiment, the database management system comprises a parser 110, resolver 108, query optimizer 106, evaluation engine 104, and storage device 102. In an embodiment, the parser 110, resolver 108, query optimizer 106, and evaluation engine 104 are software modules comprising instructions, at least some of which are loaded into the memory of a computing system and executed by one or more processors of the computing system. The instructions, in response to being executed by the processors, cause the module to perform the operations described herein. In various embodiments, the described modules may be combined in various ways as sub-modules, or as modules whose functions overlap with, combine, or duplicate the functions performed by others of the described modules.

In an embodiment, the storage device 102 is a solid-state disk drive, a mechanical disk drive, or other similar device for storing and retrieving data. In an embodiment, the storage comprises a network area storage ("NAS") device, storage area network ("SAN"), or other network-based storage system. The storage device 102 may also comprise a redundant array of independent disks ("RAID"), and erasure-coded storage system, and so forth. The storage device 102 may also comprise random-access memories, dynamic random access memories, and various other memory forms.

In an embodiment, the parser 110 obtains or otherwise receives a view definition 112. The parser 110 validates the view definition 112 by determining that a received command contains the view definition 112 and, in some instances, that the view definition is syntactically valid.

In an embodiment, the resolver 108 (sometimes referred to as a query analyzer) identifies schema elements referenced by the view definition 112 and resolves them to elements of the schema 118. This may involve further parsing and/or analysis of a parse tree or other lexicographical representation of the view definition, in order to identify references contained in the view definition 112. The resolver 108 then determines whether the identified references match corresponding elements in the schema 118. In an embodiment, the resolver 108 also determines whether data corresponding to the schema element is available for use in processing the query of the view 114. In an embodiment, the resolver 108 identifies schema elements when the query 114 of the view is executed.

In an embodiment, the query optimizer 106 formulates a query plan for executing a query 114 of the view. The query plan is provided to the evaluation engine 104, which executes the query plan to obtain query results 116. The query plan typically involves retrieving, from storage device 102, data referenced by execution of the query 114. In some cases and embodiments, the query plan may involve retrieving data from an external storage device, a hosted data storage service, and so forth.

In an embodiment, the query optimizer 106 formulates plans of execution that include steps for compiling the view definition, resolving references, and/or materializing the view. The query optimizer 106, in cases and embodiments, formulates steps for performing these operations in view of the query 114 of the view that is being executed. For example, the query optimizer 106 may determine that certain references in the view do not be fully resolved, or that the view need not be fully materialized, in view of the query 114 that is being executed.

In an embodiment, a query plan is a stored set of instructions. The stored set of instructions describes a sequence or flow of operations for performing a query. In an embodiment, a query plan is generated and stored by the query optimizer 106, and processed by the evaluation engine 104.

In an embodiment, the query optimizer 106 generates a query plan for executing a query of a view based at least in part on an estimated cost of resolving any unresolved references included in the corresponding view definition. In an embodiment, cost is estimated based on the data source associated with the reference. For example, the query optimizer 106 may determine that the unresolved reference links to local data, and estimate that the cost of the resolution will be relatively low. In another case, the query optimizer 106 may determine that the unresolved reference links to data stored on a remote data storage service. In this instance, the query optimizer 106 might determine that the resolution stage is comparatively expensive. In another instance, the query optimizer might estimate cost based on a quantity of semi-structured or unstructured data that is to be parsed to identify data corresponding to an unresolved schema element. Note that in these examples, cost refers to the computing capacity and/or time required to perform the step.

In an embodiment, although not explicitly depicted in FIG. 1, the database management system 100 comprises at least one processor and a memory, on which processor-executable instructions for the described software modules are stored.

In an embodiment, although not explicitly depicted in FIG. 1, the database management system 100 comprises a plurality of computing devices among which the various modules depicted in FIG. 1 or divided or duplicated. In an embodiment, a plurality of computing devices implements an independent database management system, such as the database management system 100 depicted in FIG. 1, which collectively operate as a distributed database. For example, each of the independent database management systems may manage a partition of a collection of data.

Figure 2:
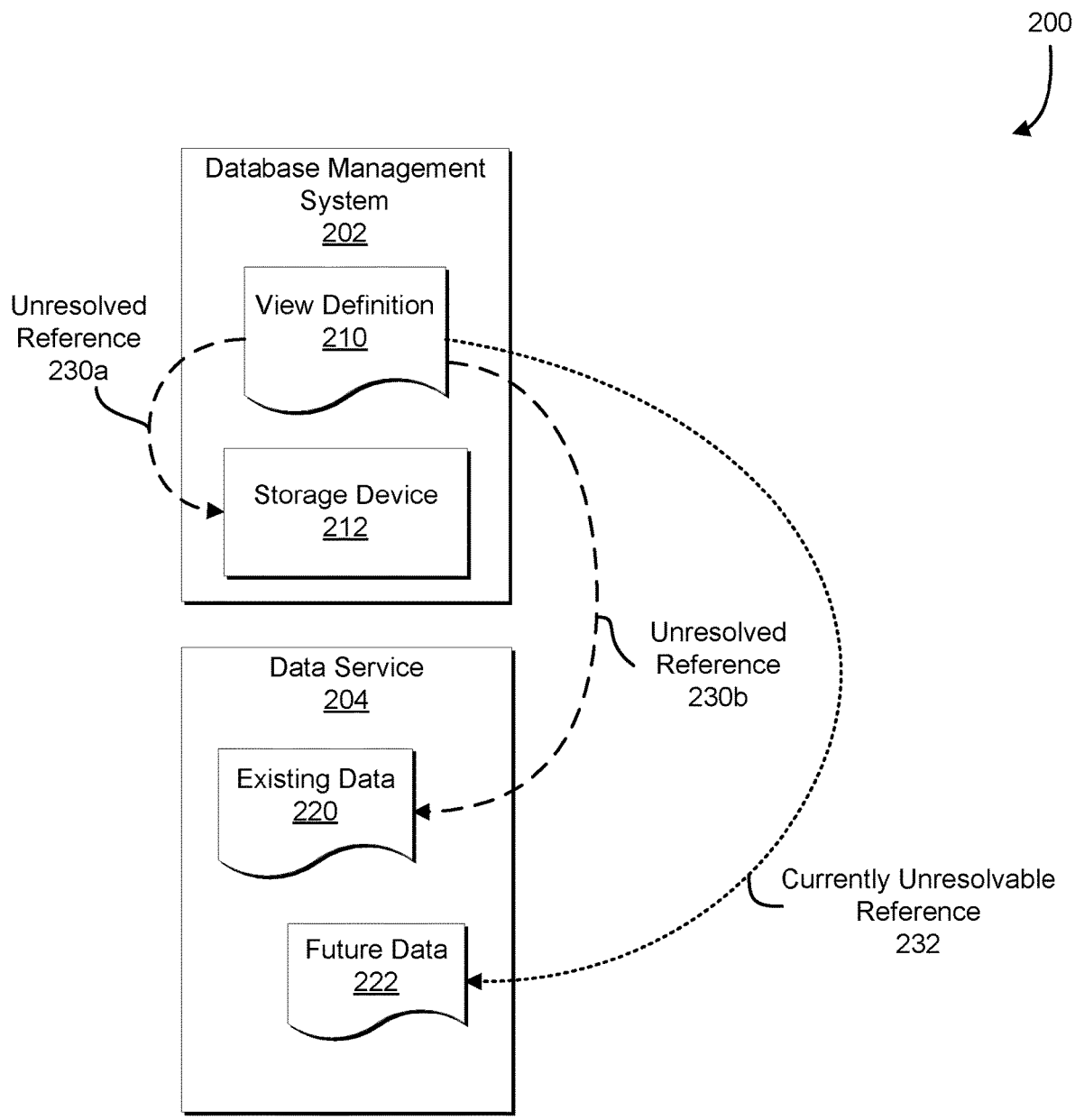
FIG. 2 illustrates resolving references to a data service, in accordance with an embodiment.

FIG. 2 illustrates resolving references to a data service, in accordance with an embodiment. In an embodiment, a distributed system 200 comprises a database management system 202 and a data service 204. The database management system 202 may correspond to the database management system 100 depicted in FIG. 1. The data service 204 is external to the database management system 202. In an embodiment, the data service 204 is a remote, hosted data storage service providing scalable, on-demand data storage.

In an embodiment, the database management system 202 processes a view definition 210 which contains references to schema elements. Specifically, in one example, the view definition 210 includes three references to schema elements. The first is an unresolved reference 230a to data stored on a storage device 212 of the database management system 202. The second is an unresolved reference 230b to existing data 220 stored by the data service 204. The third reference, in contrast, is to a presently unresolvable reference 232 to future data 222 that has not yet been stored by the data service 204.

In an embodiment, a view based on the view definition 210 can be queried even though the query definition comprises unresolved references 230a, or even a currently unresolvable reference 232. In the latter case, if the reference 232 cannot be resolved, the database management system 202 issues an error message when the query is executed, rather than at the time the view is defined. Moreover, depending on whether the schema element is resolvable at the particular time the query is executed, the database management system 202 might issue an error message some of the times a query of the view is executed, but not at other times. A schema element that was resolvable in the past might not be resolvable subsequently, and vice versa. This could occur, for example, when the reference is to a collection of data whose contents might change over time, particular semi-structured or unstructured collections of data.

In an embodiment, references in the view definition 210 refer to data that will be stored locally on the storage device 212, but which has not yet been added to the system. For example, in an embodiment, no schema element corresponding to the reference may have been added to the database management system 202 at the time the view definition 210 is received. In another example, an embodiment receives a view definition 210 which refers to an unstructured or semi-structured collection of data stored locally on the storage device 212. In this instance, the database management system determines at the time the query is executed whether or not the reference is resolvable within the collection of data.

In an embodiment, the data service 204 maintains a collection of existing data 220 and provides storage for future data 222. The data service 204 may maintain data which is structured, semi-structured, or unstructured. Structured data, for example, includes columnar or tabular data. Semi-structured data includes data in formats such as extended query language ("XML") or hypertext-markup language ("HTML") that, while not as rigidly defined as relational data, still retains structural aspects such as hierarchical organization, adherence to an ad hoc schema, and so forth. Semi-structured data may sometimes be found in various document formats, although documents may also be represented in unstructured formats. Unstructured data has little or no predictable structure. In cases and embodiments, the techniques described herein permit views to be defined and used in cases where semi-structured or unstructured data, as well as structured data, are included in the view definition.

In an embodiment, unresolved schema references in a view definition are resolved at query execution by locating corresponding data stored by the data service 204. The database management system 202 transmits a request to the data service 204 to locate the data referred to by the unresolved references. In the case of structured data, for example columnar data, the database management system 202 transmits a request to the data service 204 to locate stores of columnar data corresponding to a reference to a column in the view definition. In the case of semi-structured data, the database management system 202 transmits a request to the data service 204 to parse or scan the semi-structured data in order to locate portions of the data that correspond to a referenced schema element. Embodiments may handle unstructured data in a similar fashion. In an embodiment, for example, the database management system transmits instructions to perform syntactic and semantic analysis of a collection of unstructured data, in order to extract data that corresponds to a schema element. These operations may be performed as part of the process for resolving a schema element, and as such may be performed each time a query is executed.

Figure 3:
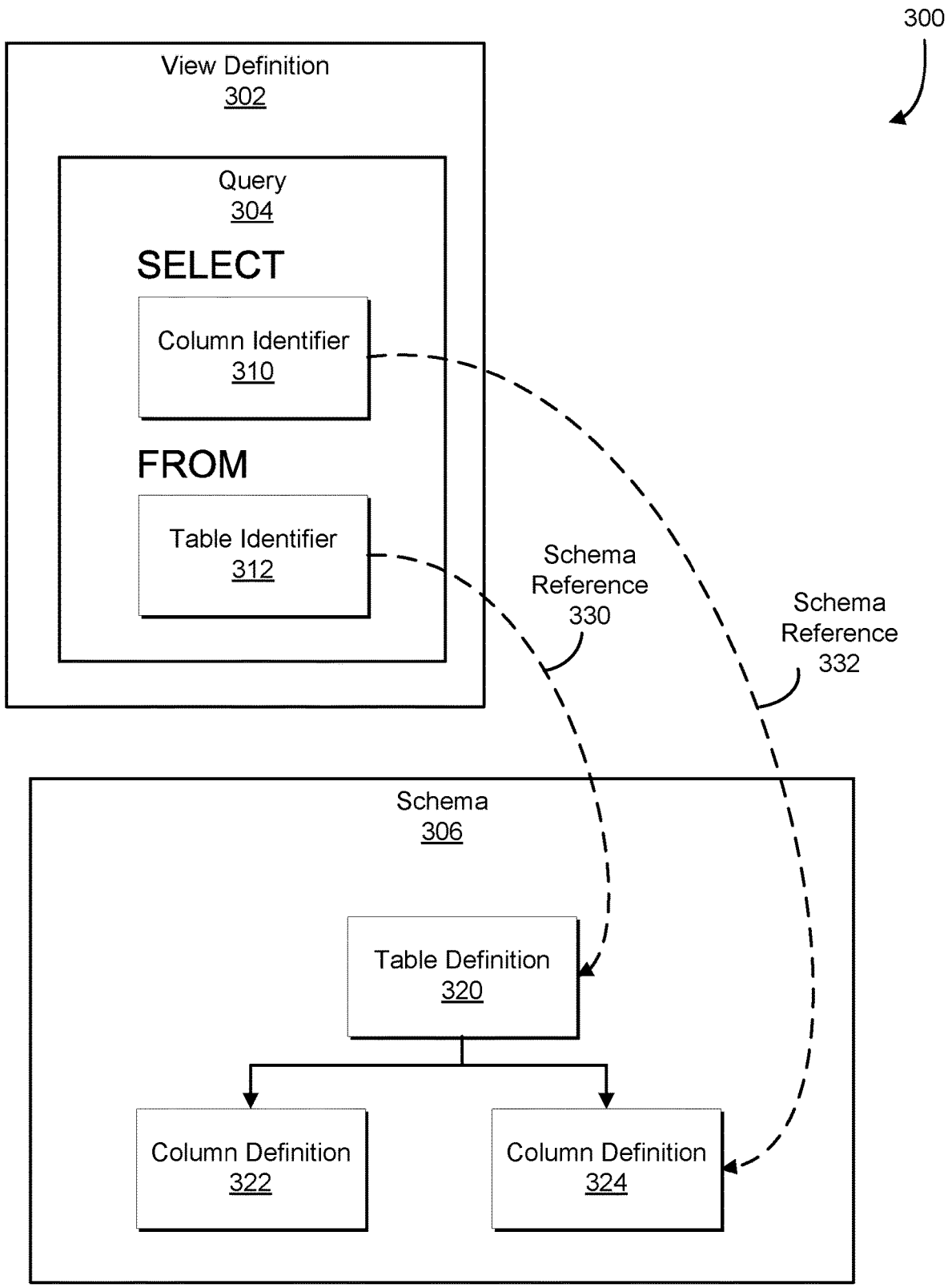
FIG. 3 illustrates references to schema elements in a query, in accordance with an embodiment.

FIG. 3 illustrates references to schema elements in a query, in accordance with an embodiment. The depicted example 300 shows a view definition 302 which comprises a query 304, in which there are unresolved references 330, 332 to elements of a schema 306. In the provided example 300, the query 304 is a SQL query comprising a command of the form "select column from table." The query 304 thus comprises a column identifier 310 and a table identifier 312. The column reference 310 corresponds to a column referenced in a projection, such as any of columns $C_1$ to $C_3$ in the example query "select $C_1$, $C_2$, $C_3$ from $T_1$." The table identifier 312 refers to a table containing the referenced columns, such as the table $T_1$ in the provided example. It will be appreciated that this example is intended to be illustrative, and should not therefore be construed in a manner which would limit the scope of the present disclosure to only the depicted example. Continuing the example, at the time the view definition 302 is received, the identifiers 310, 312 define references to a schema 306, but the references 330, 332 are unresolved.

In an embodiment, unresolved references 330, 332 refer to identifiers in a view definition 302 or query 304 for which a corresponding schema element has not been located by the database management system. In another element, the database management system, has neither located the corresponding schema elements nor located the schema itself. In another embodiment, the database management system has determined that identifiers 310, 312 correspond to elements of a defined schema, but has yet to determine where, or whether, data corresponding to the schema elements has been stored.

In an embodiment, a schema 306 includes a table definition 320 and column definitions 322, 324. The table definition includes a name or other identifier for the table, permitting the table identifier 312 in the query 304 to be mapped to the table definition. Likewise, the schema 306 comprises column definitions 322, 324. The schema 306 includes data which associates the table definition 320 with the column definitions 322, 324, and thus indicates which columns are parts of the table.

In an embodiment, a database management system resolves the reference 330 for the table identifier 312 by searching the schema 306 for a table definition 320 associated with the same table identifier.

In an embodiment, the database management system resolves the reference 332 for the column identifier 310 by searching the schema 306 for a column definition associated with the same column identifier and the same table identifier. In an embodiment, the references are treated as being unresolved between executions of the query 304, and are resolved contemporaneously with each execution of the query 304.

In an embodiment, resolution of a reference to an element of a schema involves two stages. In the first stage, as described above, it is determined whether the database management system has data defining the unresolved schema element. In an embodiment, this involves searching a metadata catalog, or similar structure, to identify entries matching the identifiers of schema elements in the view definition. In the second stage, information in the schema is used to locate data that corresponds to the schema element, and to determine whether the data is available for use in processing the query.

Figure 4:
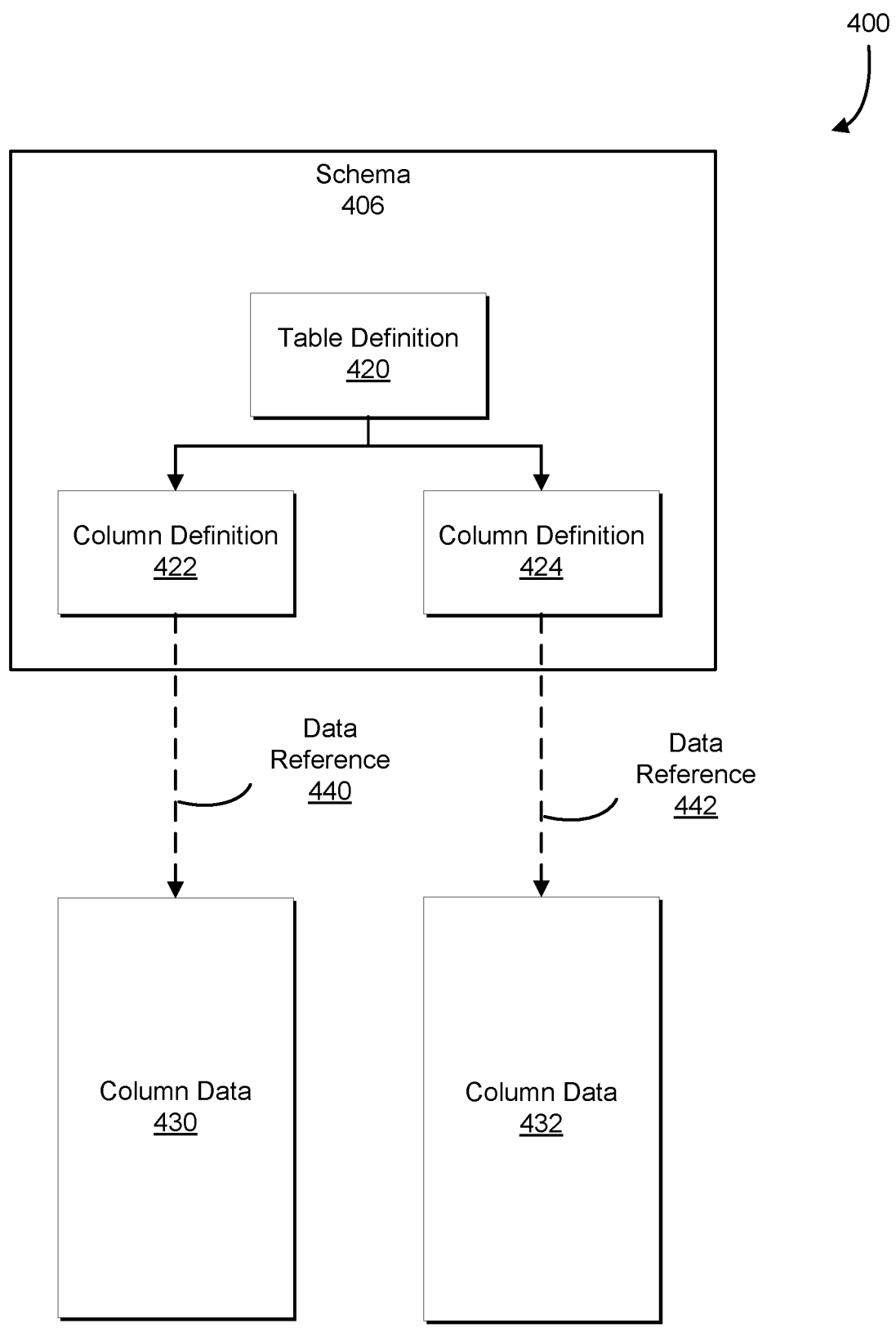
FIG. 4 illustrates references in a schema to stored data, in accordance with an embodiment.

FIG. 4 illustrates references to stored data in a schema, in accordance with an embodiment. In the example 400 of FIG. 4, a schema 406 includes a table definition 420 and definitions 422, 424 of the columns that comprise the table. The schema 406, table definition 420, and column definitions 422, 424 may correspond to the schema 306, table definition 320, and column definitions 322, 324 of FIG. 3.

In an embodiment, each of the column definitions 422, 424 is associated with a reference 440, 442 to column data 430, 432. The references 440, 442 are resolved at the time of query execution in order to locate columnar data 430, 432 that corresponds to the columns defined by the column definitions 422, 424. Resolving the references 440, 442 comprises determining the location of the column data 430, 432 that corresponds to the column definitions 422, 424.

In an embodiment, the resolution of the references 440, 442 to column data 430, 432 comprises determining where the data is located on a storage device. For example, the schema 406 can comprise data references 440, 442 which enable the database management system to locate corresponding data within a B-tree or other such structure.

In an embodiment, the resolution of the references 440, 442 to column data 430, 432 comprises determining whether a data service, such as the data service 204 illustrated by FIG. 4, has stored the column data 430, 432. For example, the database management system might send a request to the data service to return a description of the data it maintains for a particular column. The data service might respond to indicate that it has data for that column, and then proceed to make that data available for use by the database management system in processing the query.

In an embodiment, the resolution of the references 440, 442 to column data 430, 432 comprises requesting that a data service, such as the data service 204, analyze semi-structured or unstructured data to determine if the semi-structured or unstructured data includes the column data 430, 432. For example, the database management system might request that the data service 204 parse a collection of data to determine if, at the present time, the collection contains data that corresponds to the schema element.

In another embodiment, a group of data services or data stores is checked to determine if any of the group has data corresponding to the schema element. In a further aspect, no error is issued if at least one of the group has data that corresponds to the reference.

Figure 5:
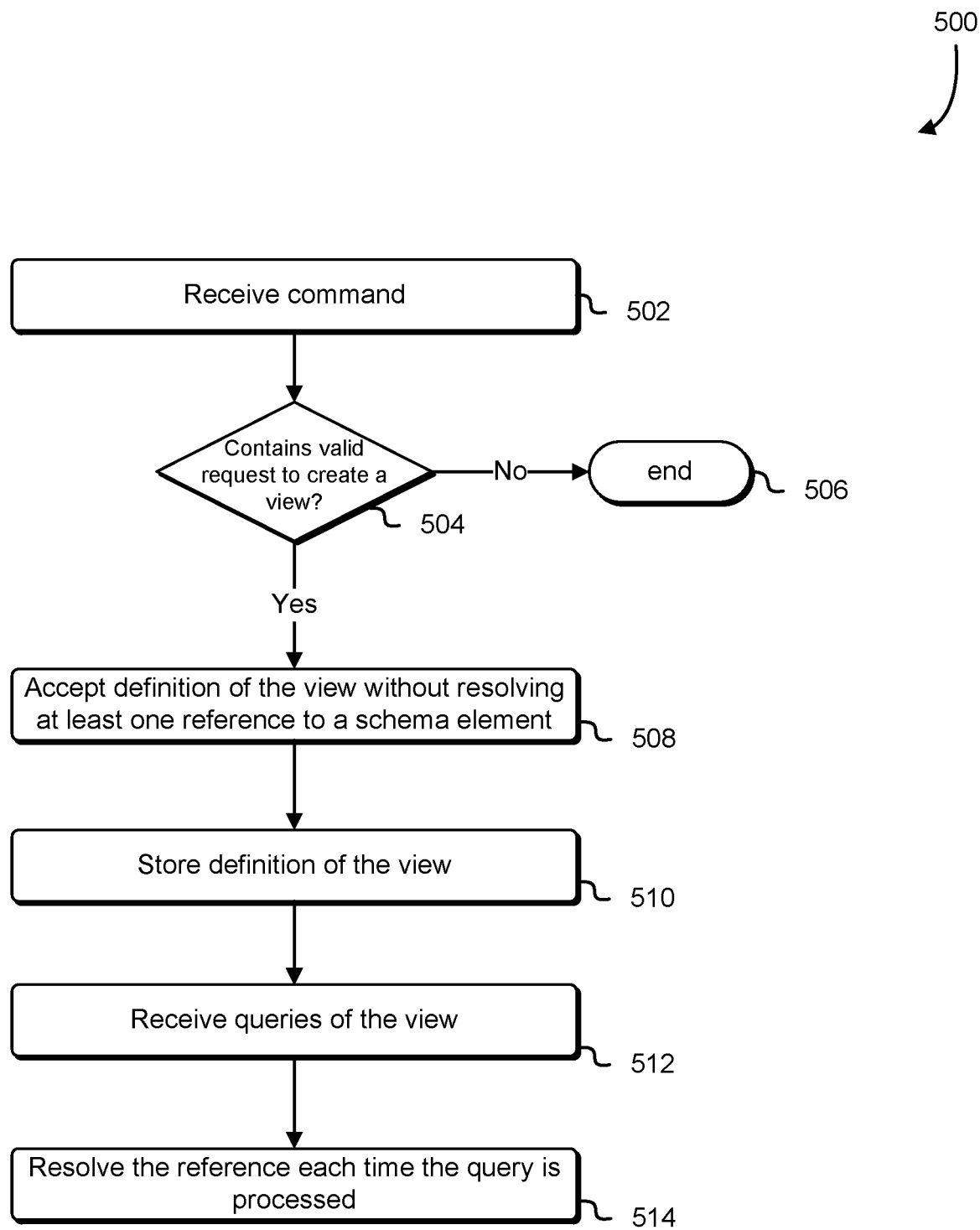
FIG. 5 illustrates an embodiment of a procedure for processing database views, in accordance with an embodiment.

FIG. 5 illustrates an embodiment of a procedure 500 for processing database views, in accordance with an embodiment. The illustrated steps are performed, in an embodiment, by a database management system such as the database management system 100 depicted in FIG. 1. Although FIG. 5 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), the at least some of the depicted steps may be reordered or performed in parallel.

At step 502, in an embodiment, the database management system receives a command. A command is a request to perform a database operation. In an embodiment, the command is expressed textually, using a language such as SQL. The database management system receives and processes a variety of commands, including requests to store data, requests to retrieve data, sometimes referred to as queries, and requests to create views.

At step 504, in an embodiment, the database management system determines whether the command contains a valid request to create a view. Here, the validity determination does not require resolving references to schema elements. For example, in an embodiment, no resolution takes place, and the validity determination is restricted to determining that the command contains a syntactically valid request to create a view, regardless of whether schema references in the command's view definition are resolvable. If the command does not contain a valid request to create a view, the process 500 ends, as depicted by step 506.

At step 508, in an embodiment, the database management system accepts the definition of the view without resolving at least one reference to a schema element. In an embodiment, accepting the view includes providing an indication that queries of the view may be submitted for processing. In an embodiment, an error message is issued if a query of a view is submitted prior to acceptance of the view definition.

At step 510, in an embodiment, the database management system stores the definition of the view. In an embodiment, the view definition is stored as text. In another embodiment, the view definition is parsed and stored using a binary representation.

At step 512, in an embodiment, the database management system receives queries of the view. In an embodiment, the query of the view is received as a SQL command. For example, the SQL command may be a "SELECT" statement which references the view as a source table.

At step 514, in an embodiment, the database management system resolves at least one unresolved reference each time a query of a view is executed. This technique is in contrast to other techniques, such as resolving all references when a view is defined or resolving all references the first time a query is executed, but not again for subsequent executions of the same query. Resolution of the references may be an expensive operation, and it might therefore appear that efficiency would be increased by resolving the references in a given view definition a single time.

In an embodiment, resolving a schema reference comprising identifying data that corresponds to the reference. In an embodiment, the identifying comprising locating the reference in a schema catalog and, based on the catalog, locating a store of data which corresponds to the reference.

Figure 6:
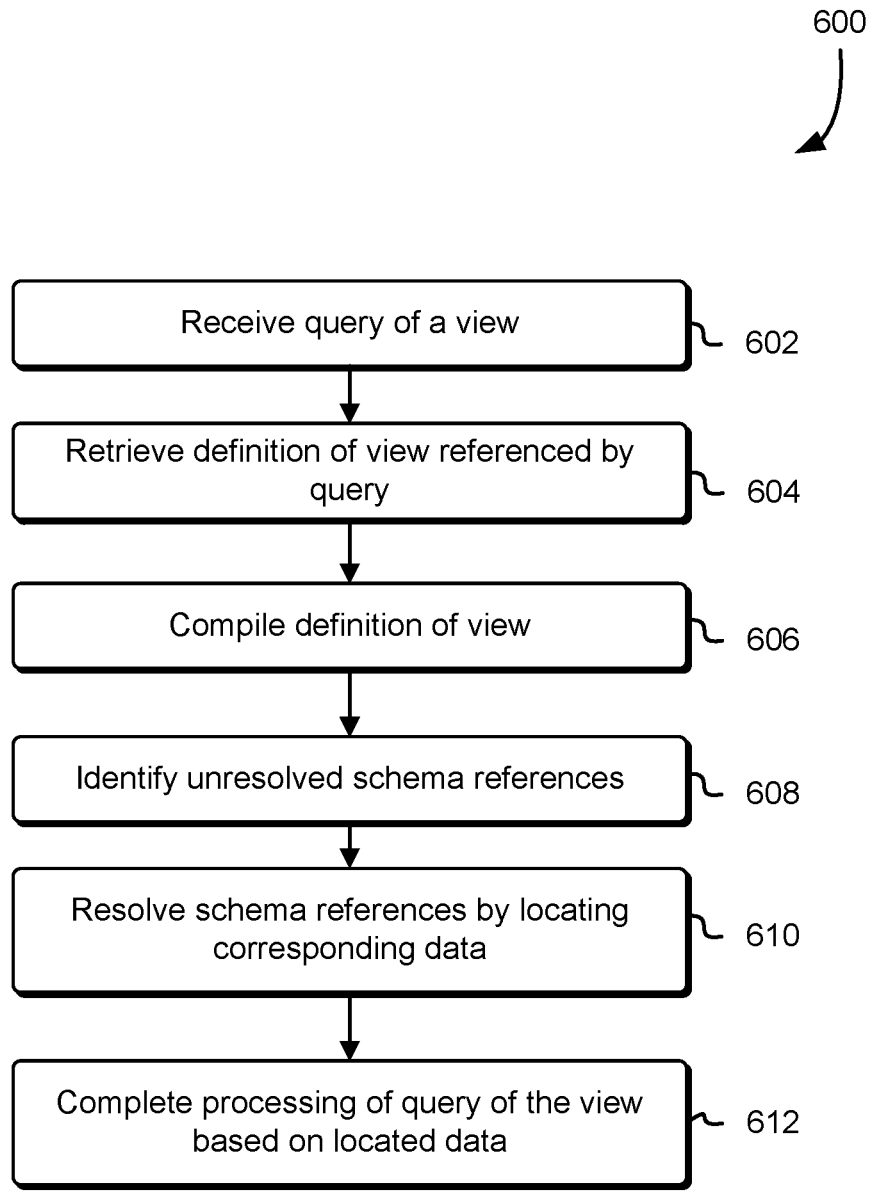
FIG. 6 illustrates an embodiment of a procedure for processing queries of database views, in accordance with an embodiment.

FIG. 6 illustrates an embodiment of a procedure for processing queries of database views, in accordance with an embodiment. In an embodiment, the illustrated steps of the example process 600 are performed by a database management system such as the database management system 100 depicted in FIG. 1. Although FIG. 6 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), the at least some of the depicted steps may be reordered or performed in parallel.

At step 602, in an embodiment, the database management system receives a query of a view. In an embodiment, the query of the view is expressed as a SQL command. For example, in an embodiment the database management system receives a "SELECT" statement which references the view as a source table, such as "SELECT*FROM ViewA," where "ViewA" refers to a view previously defined in accordance with FIG. 5.

At step 604, in an embodiment, the database management system retrieves the definition of a view referenced by the query. In an embodiment, the view definition is stored in accordance with the process illustrated by FIG. 5. In an embodiment, a textual representation of the view definition, such as a SQL query that defines the view, is loaded from a storage device of the database management system.

At step 606, in an embodiment, the database management system compiles the definition of the view. In an embodiment, compiling the view includes operations for parsing and tokenizing the view definition. These operations facilitate identification of the structure and components of the view definition, including the identification of references to schema elements that are included in the view definition.

At step 608, in an embodiment, the database management system identifies unresolved schema references. In an embodiment, the parsed view definition is examined to identify schema references included in the view definition. Some or all of the schema references may be unresolved. For example, in an embodiment all references in the view definition are resolved each time the query is executed. Accordingly, in this instance all references are treated as being unresolved. In another embodiment, some references are resolved while others are re-resolved each time a query of the view is executed.

At step 610, in an embodiment, the database management system resolves the unresolved schema references by locating data that corresponds to the reference. In an embodiment, resolving a schema reference comprising locating and/or identifying the set of data to which the reference refers. For example, if an unresolved schema reference identifies a column $C_1$, resolving the reference, in an embodiment, comprises determining where the data for the column $C_1$ is located. In an embodiment, the resolution further involves determining whether the data at the location is accessible.

At step 612, in an embodiment, the database management system completes processing of the query of the view based on the located data. For example, in an embodiment, the database management system generates a query plan for executing the query of the view, and executes the plan.

In an embodiment, generating the query plan comprises cost estimation based on facts derived during the location stage. In embodiments, the facts comprise one or more of the amount of data located during resolution, the distribution of the located data, the characteristics of the device(s) on which the data is stored, and so forth.

In an embodiment, the database management system completes processing of the query by executing the query plan and returning the obtained results of the query to the client that submitted the query.

In an embodiment, a method comprises performing operations for receiving a definition of a view of a database, in which the definition comprises a reference to an element of a database schema. The method further comprises validating the definition of the view without resolving the reference. The reference is resolved subsequently, in response to a query of the view being executed. Resolving the reference comprises, at least, determining that data corresponding to the element is accessible for processing the query.

In an embodiment, the definition of the view is validated without determining whether schema elements referenced by the definition of the view correspond to defined elements of the database schema. In an embodiment, validating the definition of the view comprises determining that the definition is syntactically valid without determining whether the definition comprises references to non-existent elements of the database schema.

In an embodiment, the element of the database schema, as described above, refers to a collection of data stored externally to the database. For example, the element might refer to data stored by a remote data storage service, such as a hosted data storage service accessible via the Internet.

In an embodiment, the element of the database schema, as described above, refers to data potentially stored in at least one of a structured or semi-structured collection of data. In cases and embodiments, it cannot be determined whether or not the collection comprises data corresponding to the schema element until the collection has been parsed. This step, as part of the resolution process, is performed in some embodiments each time a query of the view is executed. Note that this approach permits the view definition to incorporate changing collections of data. Also note that, in an embodiment, the error handling path for queries of the view is modified, such that lack of resolution does not necessarily terminate processing of the query.

In an embodiment, the method further comprises determining, each time the view is queried, whether schema elements referenced by the definition of the view correspond to defined elements of the database schema. In an embodiment, an advantage of this approach is that it permits schema elements to be added to a database after a view definition has been defined.

In an embodiment, the method further comprises resolving the reference to the schema element by at least querying a remote data storage service for a column of data corresponding to the element. In an embodiment, querying the remote data storage service comprises sending a request to the remote data storage service to provide data corresponding to the element. For example, querying the remote data storage service can comprise sending a request to download a column of data identified by a schema element.

Figure 7:
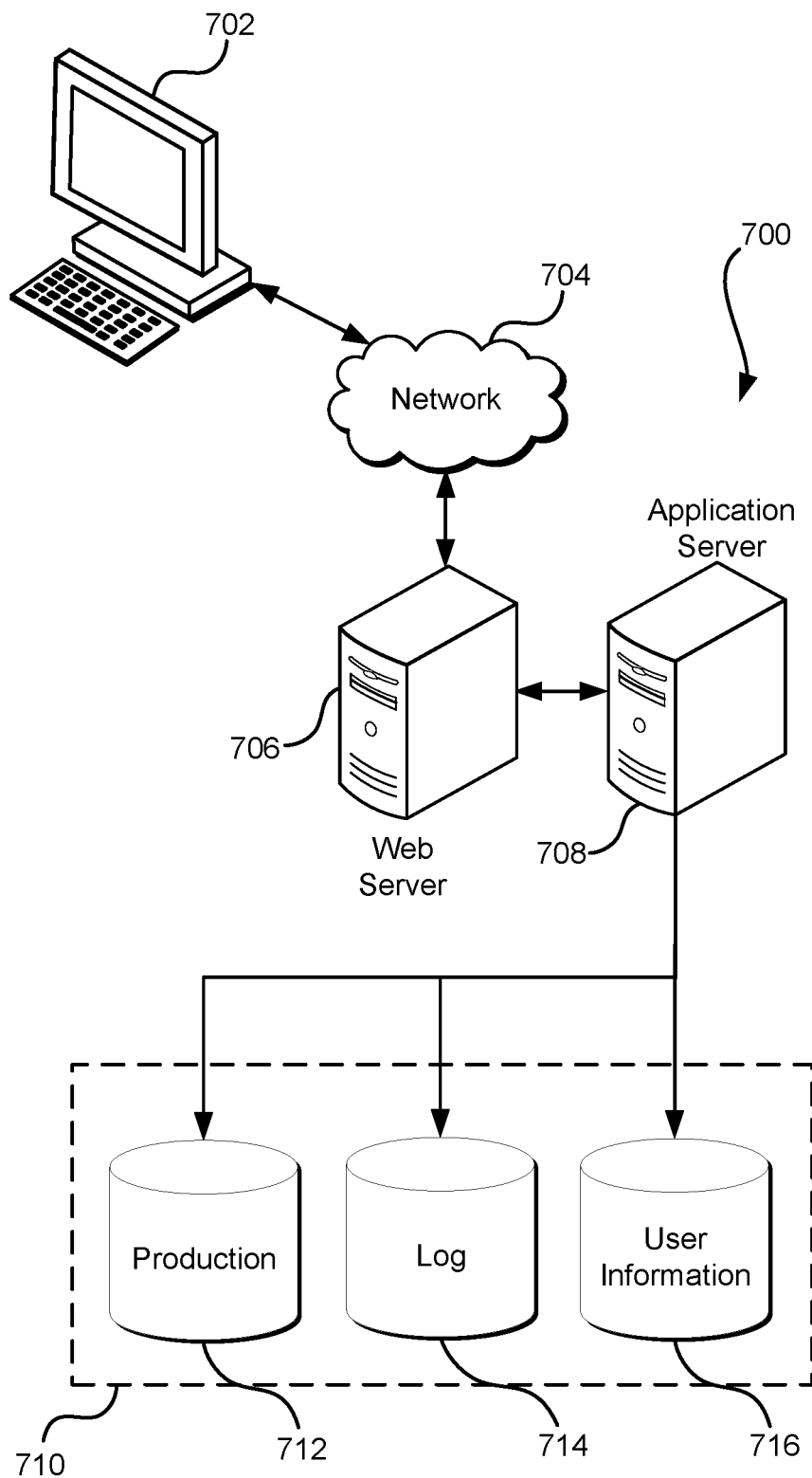
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation ("JSON"), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto and the application server 708 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle °, Microsoft °, Sybase °, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk ("DVD") or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
   at least one processor; and
   at least one memory comprising instructions that, in response to being executed by the at least one processor, cause the system at least to:
   receive a definition of a view of a database, the definition comprising a reference to an element of a database schema;
   validate the definition of the view by at least determining that the definition is syntactically correct, without determining whether the reference identifies a corresponding schema element of the database schema;
   provide to a client of the system, prior to determining whether the reference to the element refers to the corresponding schema element of the database schema, an indication that queries of the view may be submitted for processing by the system, the indication provided based at least in part on the validation of the definition of the view of the database; and
   resolve the reference to the element in response to a request to query the view, by at least determining that data corresponding to the element is available for processing the query.

2. The system of claim 1, wherein the element of the database schema corresponds to data stored by a remote data storage service.

3. The system of claim 1, wherein the element refers to data potentially stored in at least one of a semi-structured or unstructured collection of data.

4. The system of claim 3, wherein the at least one memory comprising further instructions that, in response to being executed by the at least one processor, cause the system at least to parse at least one of the semi-structured or unstructured collection of data to identify data corresponding to the element of the database schema.

5. The system of claim 1, wherein the at least one memory comprising further instructions that, in response to being executed by the at least one processor, cause the system at least to execute the query of a view based at least in part on an estimated cost of resolving unresolved references included in the definition.

6. A method, comprising:

receiving, at a database management system, a definition of a view of a database, the definition comprising a reference to an element of a database schema;

validating the definition of the view without resolving the reference to the element, based at least in part on determining that the definition of the view is syntactically valid;

providing to a client of the database management system, without determining whether the reference to the element refers to a corresponding schema element of the database schema, an indication that a query may be submitted to the view for processing by the database management system, the indication based at least in part on the validation of the definition of the view; and resolving the reference to the element in response to a request to query the view, wherein resolving the reference comprises determining that data corresponding to the element is accessible for processing the query.

7. The method of claim 6, wherein the element of the database schema refers to a collection of data stored externally to the database.

8. The method of claim 6, wherein the element refers to data potentially stored in at least one of a semi-structured or unstructured collection of data.

9. The method of claim 6, wherein the definition of the view is validated without determining whether schema elements referenced by the definition of the view correspond to defined elements of the database schema.

10. The method of claim 9, further comprising determining, each time the view is queried, whether schema elements referenced by the definition of the view correspond to defined elements of the database schema.

11. The method of claim 6, further comprising:

resolving the reference to the element by at least querying a remote data storage service for a column of data corresponding to the element.

12. The method of claim 6, wherein validating the definition of the view comprises determining that the definition is syntactically valid without determining whether the definition comprises references to non-existent elements of the database schema.

13. The method of claim 6, further comprising formulating a query plan based at least in part on a cost of resolving the reference to the element.

14. A non-transitory computer-readable storage medium having stored thereon executable instructions that, as a result of being executed by one or more processors of a computer system, cause the computer system to at least:

determine that a command comprises a definition of a view of a database, the definition comprising a reference to an element of a database schema;

validate the definition of the view without resolving whether the reference to the element identifies a corresponding schema element of the database schema, based at least in part on determining that the definition of the view is syntactically valid;

provide to a client, prior to determining whether the reference to the element refers to the corresponding schema element, an indication that queries of the view may be submitted for processing by the computer system, the indication is based at least in part on the validation of the definition of the view; and resolve the reference to the element in response to a request to query the view, wherein resolving the reference comprises determining that data corresponding to the element is available for processing the query.

15. The non-transitory computer-readable storage medium of claim 14, wherein the element of the database schema refers to a collection of data stored externally to the database.

16. The non-transitory computer-readable storage medium of claim 14, wherein the element refers to at least one of a structured or semi-structured collection of data.

17. The non-transitory computer-readable storage medium of claim 14, wherein the instructions further comprise instructions that, as a result of being executed by the one or more processors, cause the computer system to validate the definition of the view without determining whether schema elements referenced by the definition of the view correspond to defined elements of the database schema.

18. The non-transitory computer-readable storage medium of claim 14, wherein the instructions further comprise instructions that, as a result of being executed by the one or more processors, cause the computer system to determine, each time the view is queried, whether schema elements referenced by the definition of the view correspond to existing elements of the database schema.

19. The non-transitory computer-readable storage medium of claim 14, wherein the instructions further comprise instructions that, as a result of being executed by the one or more processors, cause the computer system to resolve the reference to the element by at least retrieving a column of data corresponding to the element from a remote data store.

20. The non-transitory computer-readable storage medium of claim 14, further comprising estimating a cost of resolving references to the element of the database schema.

* * * * *